(12) United States Patent
Cali et al.

(10) Patent No.: US 11,501,392 B2
(45) Date of Patent: Nov. 15, 2022

(54) MANAGING ENERGY TRANSACTIONS USING DISTRIBUTED LEDGER TECHNOLOGY

(71) Applicant: EnergyXchain, LLC, Charlotte, NC (US)

(72) Inventors: Umit Cali, Kassel Hesse (DE); David A. Doctor, Huntersville, NC (US); Robert W. Norris, Charlotte, NC (US)

(73) Assignee: ENERGYXCHAIN, LLC, Charlotte, NC (US)

( * ) Notice: Subject to any disclaimer, the term of this patent is extended or adjusted under 35 U.S.C. 154(b) by 0 days.

(21) Appl. No.: 17/565,998

(22) Filed: Dec. 30, 2021

(65) Prior Publication Data

US 2022/0122206 A1  Apr. 21, 2022

Related U.S. Application Data

(63) Continuation of application No. 17/006,329, filed on Aug. 28, 2020.
(Continued)

(51) Int. Cl.
*G06Q 50/18* (2012.01)
*G06Q 50/06* (2012.01)
(Continued)

(52) U.S. Cl.
CPC .......... *G06Q 50/18* (2013.01); *G06F 1/3203* (2013.01); *G06Q 20/389* (2013.01); *G06Q 40/04* (2013.01);
(Continued)

(58) Field of Classification Search
USPC .................................................. 705/50–79
See application file for complete search history.

(56) References Cited

U.S. PATENT DOCUMENTS 8,732,047 B2   5/2014  Sandholm et al.
2006/0036448 A1  2/2006  Haynie et al.
(Continued)

FOREIGN PATENT DOCUMENTS

FR     3094519       *  3/2019
FR     3094519 A1   *  3/2019   ........... G06F 21/645
(Continued)

OTHER PUBLICATIONS

R. K. Kodali, S. Yerroju and B. Y. K. Yogi, "Blockchain Based Energy Trading," TENCON 2018—2018 IEEE Region 10 Conference, 2018, pp. 1778-1783, doi: 10.1109/TENCON.2018.8650447, attached as a PDF file (Year: 2018).*

(Continued)

*Primary Examiner* — James D Nigh
*Assistant Examiner* — Margaret M Neubig
(74) *Attorney, Agent, or Firm* — Norton Rose Fulbright US LLP

(57) ABSTRACT

Methods and systems for originating and monitoring energy transactions using distributed ledger technology are provided. In one embodiment, a method is provided that includes receiving a first request to originate a contract associated with an energy transaction. The first request may include a first draft of the contract. A first transaction may be generated based on the first draft of the contract and may be added to a distributed ledger. Transaction information regarding the energy transaction may be received and a second draft of the contract may be generated based on the transaction information. A second transaction may be generated based on the second draft of the contract and may be added to the distributed ledger.

20 Claims, 10 Drawing Sheets

Related U.S. Application Data

(60) Provisional application No. 62/894,011, filed on Aug. 30, 2019.

(51) Int. Cl.
  *G06Q 40/04* (2012.01)
  *G06Q 20/38* (2012.01)
  *H02J 3/00* (2006.01)
  *G06F 1/3203* (2019.01)

(52) U.S. Cl.
  CPC .............. *G06Q 50/06* (2013.01); *H02J 3/008* (2013.01); *G06Q 2220/00* (2013.01)

(56) References Cited

U.S. PATENT DOCUMENTS

| | | | |
|---|---|---|---|
| 2009/0313174 | A1 | 12/2009 | Hafner et al. |
| 2013/0238158 | A1 | 8/2013 | Gan et al. |
| 2016/0260171 | A1* | 9/2016 | Ford .................... G06Q 20/389 |
| 2017/0103468 | A1 | 4/2017 | Orsini et al. |
| 2017/0287090 | A1 | 10/2017 | Hunn et al. |
| 2018/0285838 | A1 | 10/2018 | Franaszek et al. |
| 2018/0315141 | A1 | 11/2018 | Hunn et al. |
| 2018/0349706 | A1* | 12/2018 | Hodgson .......... H04N 21/23439 |
| 2019/0392511 | A1* | 12/2019 | Mahajan ................ G06Q 20/02 |
| 2020/0364813 | A1* | 11/2020 | Turgman ................ G06Q 10/06 |
| 2020/0380512 | A1* | 12/2020 | Witkowski ............. G06Q 50/06 |

FOREIGN PATENT DOCUMENTS

| | | | | |
|---|---|---|---|---|
| FR | 3094519 | * | 10/2020 | |
| FR | 3094519 A1 | * | 10/2020 | ........... G06F 21/645 |

OTHER PUBLICATIONS

"Where the contract code located physically and how it can be accessed?", downloaded from https://ethereum.stackexchange.com/questions/54655/where-the-contract-code-located-physically-and-how-it-can-be-accessed, dated Jul. 2018 and attached as a PDF file, (Year: 2018).*

R. K. Kodali, S. Yerroju and B. Y. K. Yogi, "Blockchain Based Energy Trading," TENCON 2018—2018 IEEE Region 10 Conference, 2018, pp. 1778-1783, doi: 10.1109/TENCON.2018.8650447, previously attached as a PDF file (Year: 2018).*

International Preliminary Report corresponding to related International Patent Application No. PCT/US2020/048502, dated Mar. 10, 2022, 8 pages.

International Search Report corresponding to related International Patent Application No. PCT/US2020/048502 dated Nov. 20, 2020, 3 pages.

International Written Opinion corresponding to related International Patent Application No. PCT/US2020/048502 dated Nov. 20, 2020, 10 pages.

International Search Report corresponding to related International Patent Application No. PCT/US2021/018389 dated May 6, 2021, 3 pages.

International Written Opinion corresponding to related International Patent Application No. PCT/US2021/018389 dated May 6, 2021, 6 pages.

Wang et al. "A Novel Electricity Transaction Mode of Microgrids Based on Blockchain and Continuous Double Auction," Energies 10.12 (2017): 1971, Nov. 26, 2017, pp. 1-22.

* cited by examiner

MANAGING ENERGY TRANSACTIONS USING DISTRIBUTED LEDGER TECHNOLOGY

CROSS REFERENCE TO RELATED APPLICATION

The present application claims priority to U.S. Provisional Application No. 62/894,011, filed on Aug. 30, 2019 and U.S. application Ser. No. 17/006,329, filed on Aug. 28, 2020, the disclosures of which is incorporated by reference for all purposes.

GOVERNMENT RIGHTS

This invention was made with government support under Award Number 1951161, awarded by the National Science Foundation. The government has certain rights in the invention.

SUMMARY

The present disclosure presents new and innovative systems for managing energy transactions. In one aspect, a method is provided that includes receiving, from a first computing device associated with a first party of an energy transaction, a first request to originate a contract associated with the energy transaction, wherein the first request includes a first draft of the contract and adding a first transaction to a distributed ledger, the first transaction generated at least in part based on contents of the first draft of the contract. The method may further include receiving, from at least one of the first computing device and a second computing device associated with a second party of the energy transaction, transaction information regarding the energy transaction. The method may also include generating a second draft of the contract based on the transaction information and adding a second transaction to the distributed ledger, the second transaction generated at least in part based on contents of the second draft of the contract.

In a second aspect according to the first aspect, the method further includes receiving, from at least one of the first computing device and the second computing device, a request to finalize the contract and adding a third transaction to the distributed ledger, the third transaction generated at least in part based on a finalized version of the contract.

In a third aspect according to the second aspect, the third transaction includes (i) an identifier of the first party, (ii) an identifier of the second party, and (iii) a hash generated at least in part based on an image of the finalized version of the contract.

In a fourth aspect according to any of the first through third aspects, the method further includes receiving, prior to receiving the first request, a second request to create the contract, wherein the second request specifies a contract type and transmitting, to the first computing device, a contract template associated with the contract type.

In a fifth aspect according to the fourth aspect, the method also include adding a fourth transaction to the distributed ledger, the fourth transaction generated at least in part based on the contract template.

In a sixth aspect according to the fifth aspect, the fourth transaction includes (i) an identifier of the first party and (ii) an identifier of the contract type.

In a seventh aspect according to any of the fourth through sixth aspects, generating the second draft of the contract includes adding the transaction information to one or more corresponding fields within the contract template.

In an eighth aspect according to any of the first through seventh aspects, the first transaction includes (i) an identifier of a first party associated with the first computing device and (ii) an identifier of the second party.

In a ninth aspect according to any of the first through eighth aspects, the transaction information includes trade volume information and/or price information.

In a tenth aspect according to any of the first through ninth aspects, the first party is a seller and the second party is a buyer.

In an eleventh aspect according to the tenth aspect, the buyer is identified using an auction system.

In a twelfth aspect according to any of the first though eleventh aspects, the second transaction includes (i) an identifier of the of the first party, (ii) an identifier of the second party, and (iii) a copy of at least a subset of the transaction information.

In a thirteenth aspect according to any of the first through twelfth aspects, the method further includes executing one or more of a nomination process, a confirmation process, a scheduling process, a reconciliation process, billing and payment processes, and imbalance resolution processes.

In a fourteenth aspect according to any of the first through thirteenth aspects, the method further includes storing, in a database, a copy of at least one of the first draft of the contract, the second draft of the contract, the first transaction and the second transaction.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BACKGROUND

Millions of energy transactions occur daily on a system within energy production systems. Transaction participants may be energy or energy resource producers, energy or energy resource consumers, transportation or delivery providers, and/or independent third parties paid a fee to manage transactions. Many companies still use antiquated energy transaction management systems, which can be complicated, monolithic infrastructures that cause delays and prevent new revenue-generating opportunities by blocking the timely flow of information.

DETAILED DESCRIPTION OF EXAMPLE EMBODIMENTS

Figure 1:
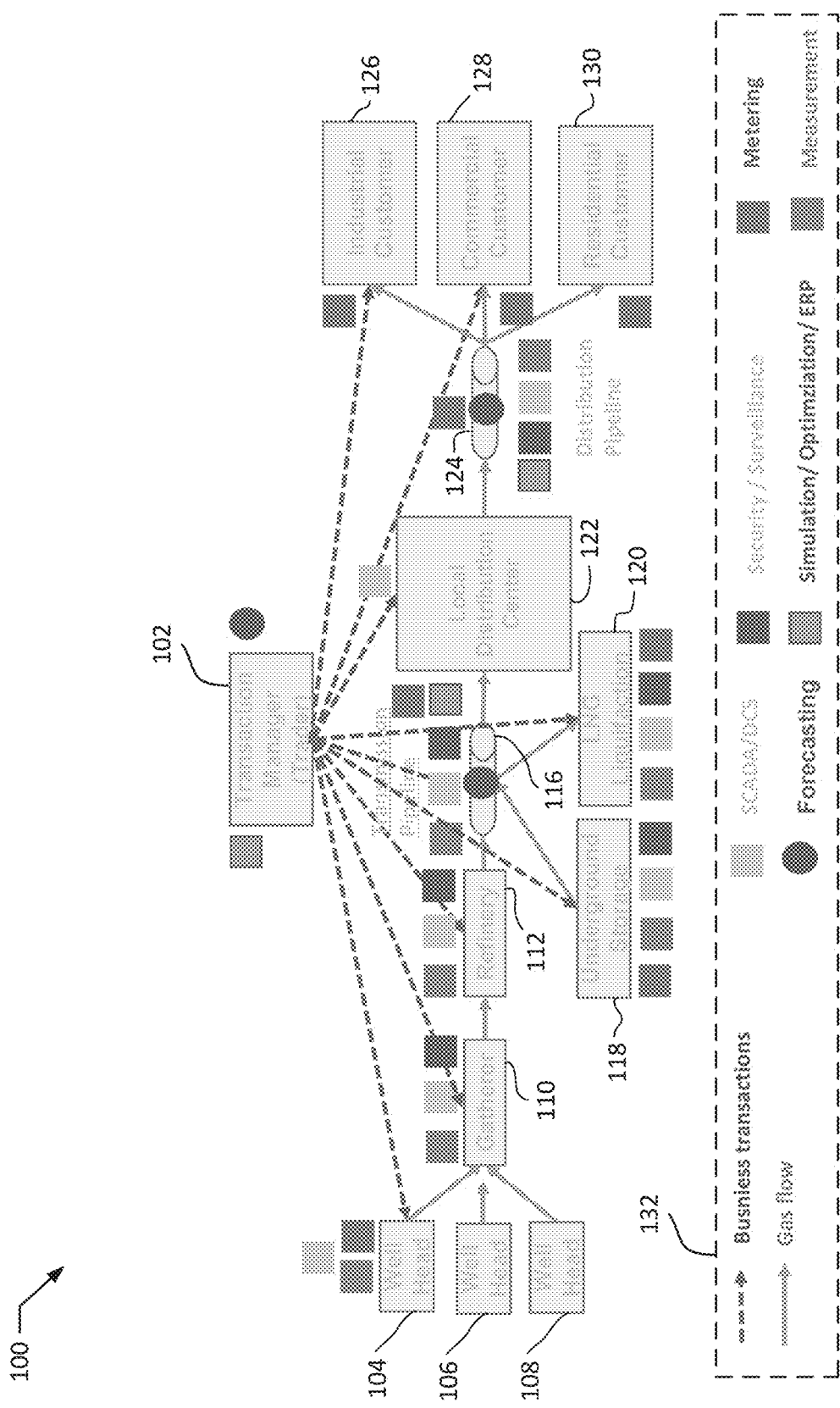
FIG. 1 depicts a transaction and fulfillment flow for participants in a natural gas value chain and corresponding transactions according to an exemplary embodiment of the present disclosure.

Aspects of the present disclosure involve systems and methods for originating, negotiating and executing energy transactions using distributed ledger technology and/or interactive smart contracts. For example, the disclosed system may facilitate originating, negotiation and execution of contracts for energy transactions such as a buy/sell agreement at a receipt point, a shipping agreement on a pipeline or distribution company from receipt to delivery point, a buy/sell agreement at a delivery point, and/or any other energy transaction involving multiple participants.

In various aspects, the disclosed system implements techniques that utilize distributed ledger technology (DLT) to aggregate the receipt, shipment, and/or delivery requirements for all participants in an energy transaction (e.g., within a contract for the energy transaction). For example, DLT may include blockchain implementations, such as public blockchains or private blockchains. It should be understood that references to "blockchain" within the present disclosure may correspond to DLT generally, blockchain technology, or both. For example, the energy transaction may concern natural gas, oil, electricity, or any other type of energy, energy source, or energy-related item or service. The system may execute to optimize the receipts, shipments, and deliveries for all participants in a transaction. For example, the system may recognize the receipt and delivery priorities, commodity costs, shipping costs, fuel, and other costs and requirements contractually agreed or specified by all participants in an energy transaction. In one aspect, the system employs the combination of blockchain (a type of DLT) and interactive smart contracts to enable transaction negotiation, storage, and verification instantly across a network, which may reduce operating costs, enable more secure storage and management of transaction data, and improve the speed of energy transaction processing. The system may determine the appropriate period of nomination and the cycle during which the nomination should be submitted for a transaction and may submit the nomination as needed. Any transaction participant may observe the status of the transaction at any time via the blockchain.

In various aspects, energy transactions as discussed herein may include any transaction concerning one or more energy resources. For example, energy transactions may include production of, transportation of, financing of, delivery of, storage of, and/or usage of energy or energy resources. For example, energy resources may include natural gas, oil, or oil derivatives, energy production equipment, electricity, solar panels, wind turbines, particular quantities, or amounts of energy. Additional or alternative types of energy transactions and/or types of energy resources may be readily apparent to one skilled in the art based on the contents of the present disclosure. All such energy transactions and energy resources are hereby contemplated within the scope of the present disclosure. Furthermore, the examples discussed herein focus on energy transactions concerning natural gas. It should be understood that similar techniques may be used to process any type of energy transaction (or other types of transaction unrelated to the energy industry).

FIG. 1 depicts a transaction and fulfillment flow 100 for participants in an energy transaction. In particular, FIG. 1 may depict a transaction and fulfillment flow 100 for participants in energy transaction concerning the extraction, purchase and delivery of natural gas. The transaction and fulfillment flow 100 includes a transaction manager 102, who may be responsible for monitoring fulfillment and compliance with the energy transaction for natural gas. For example, the transaction and fulfillment flow 100 includes an energy producer 104,106 and 108, a gatherer 110, a refinery 112, a transmission pipeline 116, a local distribution center 122, and customers 126, 128, 130, who may all be parties to the energy transaction. The gatherer 110 may be responsible for gathering natural gas from various wellheads 104, 106, 108. Natural gas may then be provided to a refinery 112, who may refine the natural gas into a usable product. Natural gas may then proceed through a transmission pipeline 116 to the local distribution center 122. The transmission pipeline 116 may be associated with one or more underground storage facilities 118 and/or liquid natural gas (LNG) liquification facilities 120. Liquid natural gas may be more compact and accordingly easier to transmit than gaseous natural gas. Additionally or alternatively, natural gas may need to be stored in liquid or gaseous forms during transmission to the local distribution center 122. Accordingly, the transmission pipeline 116 may include one or more underground storage facilities 118.

Once received by the local distribution center 122, the natural gas may be distributed to customers 126, 128, 130. In particular, the local distribution center may have different types of customers, including industrial customers 126 (e.g., industrial plants or factories using natural gas), commercial customers 128 (e.g., offices, stores, or other commercial business facilities), and residential customers 130 (e.g., homes, apartments, apartment complexes). Certain customers may be party to the energy contract. In particular, certain industrial customers 126 and commercial customers 128 may be party to the energy transaction and may accordingly be monitored by the transaction manager 102. The customers 126, 128, 130 may receive the natural gas from the local distribution center 122 via one or more distribution pipelines 124.

As can be seen in the legend 132, each stage of the transaction and fulfillment flow 100 includes different required tasks and services to ensure the transaction is being fulfilled accurately and completely. In particular, metering services (e.g., determining the amount of natural gas entering and/or leaving) are required at the wellheads 104, 106, 108, the transmission and distribution pipelines 116, 124, the underground storage facility 118, the liquification facility 120, and the customers 126, 128, 130. Additionally, measurement services (e.g., measuring the purity and/or quality of natural gas entering and/or leaving) are required at the wellheads 104, 106, 108, the gatherer 110, the refinery 112, the transmission pipeline 116, the underground storage facility 118, the liquification facility 120, and the distribution pipeline 124. Control services (e.g., distributed control system (DCS) and/or supervisory control and data acquisition (SCADA) systems for automating plants or other production facilities) may be required at the wellheads 104, 106, 108, the gatherer 110, the refinery 112, the transmission pipeline 116, the underground storage 118, the liquification facility 120, the local distribution center 122, and the distribution pipeline 124. Security and surveillance services may further be required at the gatherer 110, the refinery 112, the transmission pipeline 116, the underground storage 118, the liquification facility 120, and the distribution pipeline 124. Furthermore, forecasting, simulation, optimization, and/or enterprise relationship management (ERP) services may be required at various points in the transaction and fulfillment flow 100. For example, forecasting, simulation, optimization, and/or ERP services may be required by the transmission pipeline 116 and the distribution pipeline 124. As another example, the transaction manager 102 may use forecasting, simulation, optimization, and/or ERP services to determine whether the transaction can be fulfilled (e.g., based on current commodity availability and shipping capacity by the gatherer 110, current inventory levels, customer demand, and the like or current shipping capacity of the transmission pipeline 102).

It should be appreciated that the transaction fulfillment flow 100 depicted in FIG. 1 and discussed above is merely exemplary. For example, in additional or alternative implementations, transaction management flows for natural gas transactions may include additional services performed by each of the parties to the energy transaction and/or may exclude one or more of the above-discussed services. Additionally or alternatively, transaction flows may similarly be used to monitor different types of energy transaction (e.g., energy transactions for different types of energy).

As can be appreciated in the transaction flow 100, the production, delivery, and consumption of energy may require many energy transactions between multiple different parties. For example, there may be separate contracts with separate requirements for energy transactions at each of the operations in the transaction flow 100. Furthermore, each of the energy transactions may have two or more parties.

Figure 2:
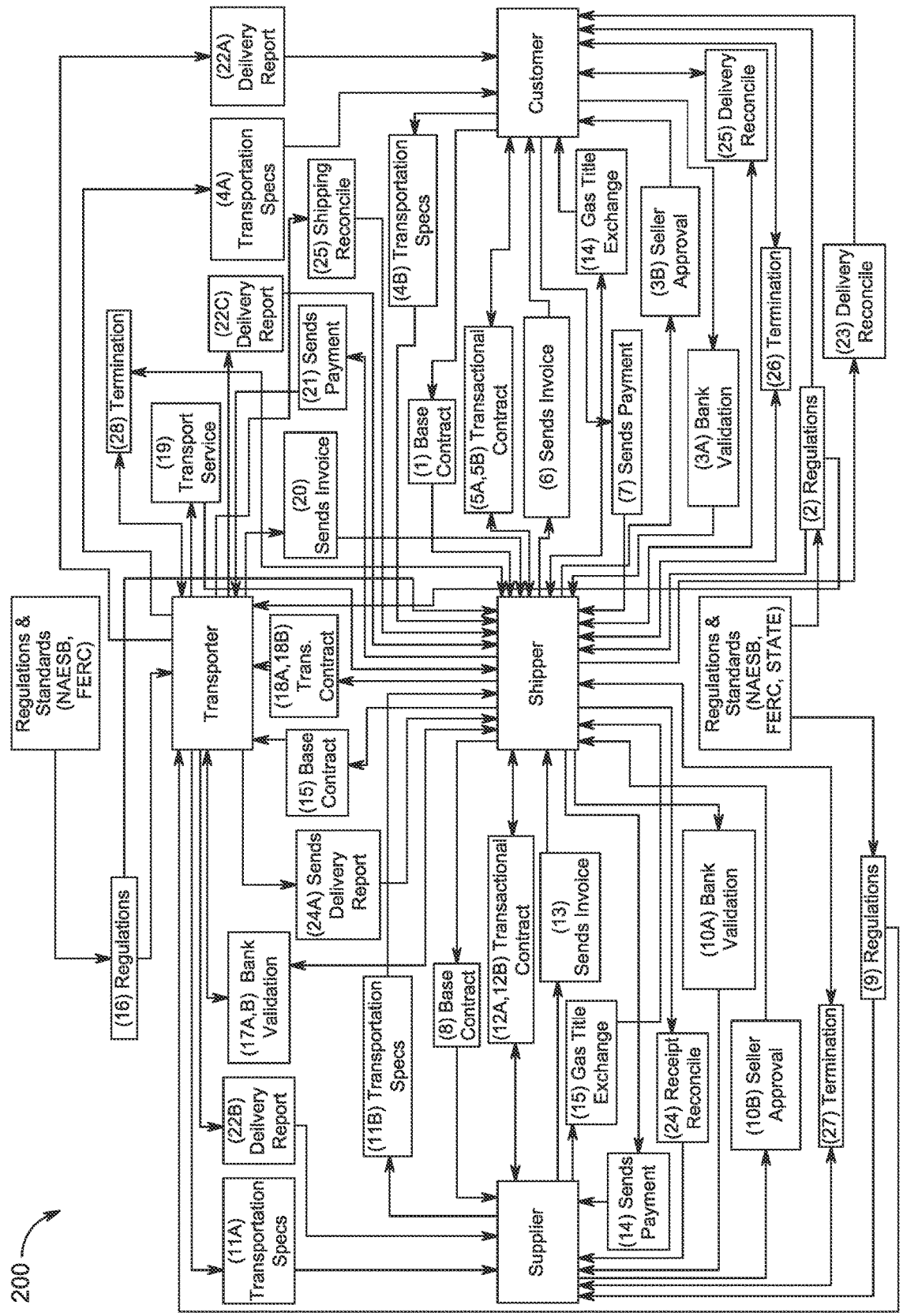
FIG. 2 depicts a transaction management flow for an energy transaction according to an exemplary embodiment of the present disclosure.

FIG. 2 depicts a transaction management flow 200 for an energy transaction according to an exemplary embodiment of the present disclosure. In particular, FIG. 2 may depict a transaction management flow 200 for a buy/sell agreement on a pipeline or distribution company from receipt to delivery point, and a buy/sell agreement at a delivery point. The transaction management flow 200 includes three type of transactions, all of which may correspond to one or more of the transaction steps in the transaction and fulfillment flow 100. A supplier and shipper transaction is depicted where the supplier is the seller of the energy resource (e.g., an energy commodity) and the shipper is the buyer. A shipper and transporter transaction is depicted where the transporter is the seller of the energy resource (e.g., shipping capacity) and the shipper is the buyer. A shipper and customer transaction is depicted where the shipper is the seller of the energy resource (e.g., the energy commodity) and the customer is the buyer of the energy resource.

Figure 3:
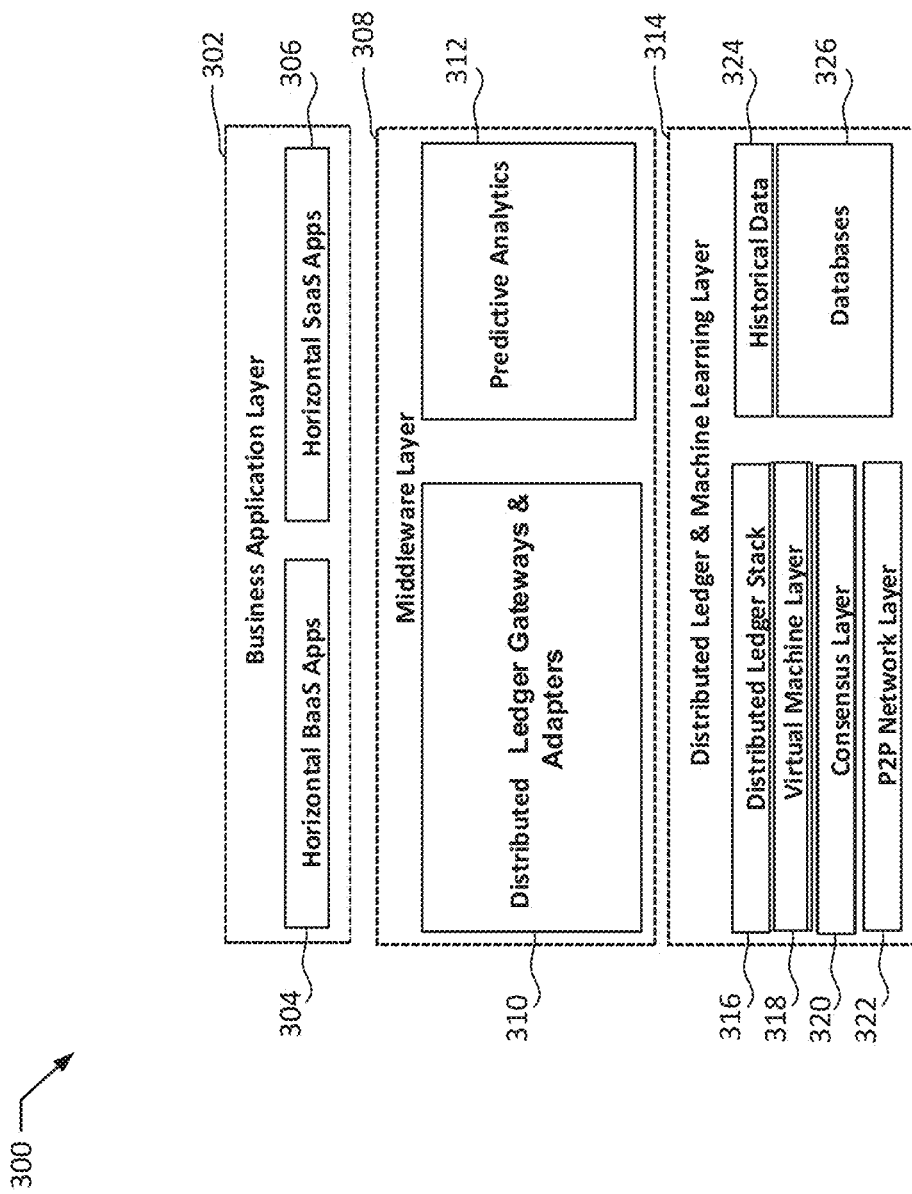
FIG. 3 depicts a system according to exemplary embodiments of the present disclosure.

FIG. 3 depicts a system 300 according to exemplary embodiments of the present disclosure. The system 300 may be configured to receive and process information regarding energy transactions (e.g., negotiation information, status information, fulfillment information, security information, and the like) to execute actions via smart contracts and to integrate with a distributed ledger to store the information or determine whether the information indicates compliance with a previously negotiated energy transaction. The system 300 includes a business application layer 302, a middleware layer 308, and a distributed ledger and machine learning layer 314.

The application layer includes horizontal applications ("apps"), which may be software services or processes executing on computing devices to provide front-end services, integration services, and the like. In particular, the applications may enable the system 300 to integrate with the information technology (IT) systems of users or entities negotiating, contracting, or monitoring compliance for an energy transaction. In particular, the application layer 302 may include horizontal software as a service (SaaS) applications 306 and horizontal blockchain as a service (BaaS) applications 304. The SaaS applications 306 may be configured to integrate services provided by the system 300 (e.g., by the middleware layer 308 and/or the distributed ledger and machine learning layer 314) with IT systems associated with users or other entities accessing the system 300. The BaaS applications 304 may provide services that improve access to, visualization of, and integration with distributed ledger technologies used by the system 300. For example, the BaaS applications 304 may provide integration services that allow users to view a distributed ledger containing transactions related to an energy transaction. As another example, the BaaS applications 304 may enable users to create or view individual entries (i.e., individual transactions) on a distributed ledger related to a particular energy transaction.

The middleware layer 308 may be configured to provide a communicative interface between the business application layer 302 and the distributed ledger and machine learning layer 314. For example, the middleware layer 308 includes distributed ledger gateways and adapters 310 and predictive analytics services 312. The distributed ledger gateways and adapters 310 may be configured to provide communicative services between the BaaS applications 304 and distributed ledgers storing information related to an energy transaction. For example, the distributed ledger gateways and adapters 310 may receive a request from a BaaS application 304 to view transactions on a distributed ledger related to a particular energy transaction. The distributed ledger gateways and adapters 310 may be configured to communicate with the distributed ledger to identify corresponding transactions and to provide copies of the identified transactions to the BaaS applications 304. The predictive analytics services 312 may provide data analysis, machine learning, artificial intelligence, and similar services for use in analyzing data related to energy transactions. For example, the predictive analytics services 312 may include statistical analysis libraries, artificial intelligence libraries, machine learning libraries, applications configured to perform data analysis, machine learning, or artificial intelligence analysis, and the like.

The distributed ledger in the distributed ledger and machine learning layer 314 may be configured to directly interact with one or more distributed ledgers storing information regarding energy transactions and/or to provide machine learning or other data analysis services. For example, the distributed ledger and machine learning layer 314 includes a distributed ledger stack 316. The distributed ledger stack 316 may be configured to interact with and/or at least partially implement a distributed ledger that is used to store and verify energy transaction information. For example, the distributed ledger stack 316 may act as a node of the distributed ledger and/or may interact with or otherwise interface with nodes of the distributed ledger. In addition, the distributed ledger and machine learning layer 314 includes a virtual machine layer 318, a consensus layer 320, and a peer-to-peer (P2P) network layer 322. A virtual machine layer 318 may implement one or more virtual computing devices (e.g., virtual processors, virtual memories) configured to execute as nodes of a distributed ledger and/or configured to execute software or applications to directly interface with nodes of a distributed ledger. For example, nodes of the distributed ledger may communicate using the P2P network layer 322, which may provide communication services according to one or more P2P communication protocols (e.g., the BitTorrent protocol, the Bitcoin P2P protocol, the Advanced Peer-to-Peer Networking (APPN) protocol, and the like). The consensus layer 320 may be used to negotiate consensus according to various distributed ledger configurations. For example, the consensus layer 320 may be used to negotiate between nodes of a distributed ledger to verify valid transactions to add to the distributed ledger, thereby reaching consensus. As a specific example, the consensus layer 320 may implement one or more consensus protocols such as a proof of work consensus protocol, proof of stake consensus protocol, delegated proof of stake consensus protocol, practical *Byzantine* fault tolerance protocol, ripple protocol, and the like. Transactions received to be added to a distributed ledger may first have to be validated according to the consensus protocol before being added to the distributed ledger (e.g., within a block of the distributed ledger). The proposed approach is designed to be utilized in any type of current and future version of DLT.

The distributed ledger and machine learning layer 314 may also include historical data 324. Historical data 324 may be used by the predictive analytics services 312. For example, the historical data 324 may store data regarding energy transactions, interactions with the distributed ledger, negotiations regarding energy transactions, compliance data associated with energy transactions, or any other operations performed by the system 300 (or discussed herein). In particular, the historical data 324 may be stored in one or more databases 326. In certain instances, the historical data 324 may additionally or alternatively be stored on a distributed ledger. For example, data stored by the system 300 (or any other system discussed herein) may be stored using a distributed file system, such as an InterPlanetary File System (IPFS). IPFS is a peer-to-peer distributed file system that may be used to connect stored data to a common distributed ledger infrastructure. Such distributed file system implementations may be preferable to more conventional storage techniques (e.g., server-based and/or local databases). For example, IPFS has no single point of failure and nodes implementing the distributed ledger used to store the data do not need to trust each. Furthermore, distributed file systems may support distributed content delivery, which saves bandwidth and prevents direct denial of service (DDoS) attacks, which other data communication protocols (e.g., HTTP) may remain vulnerable to.

Figure 4:
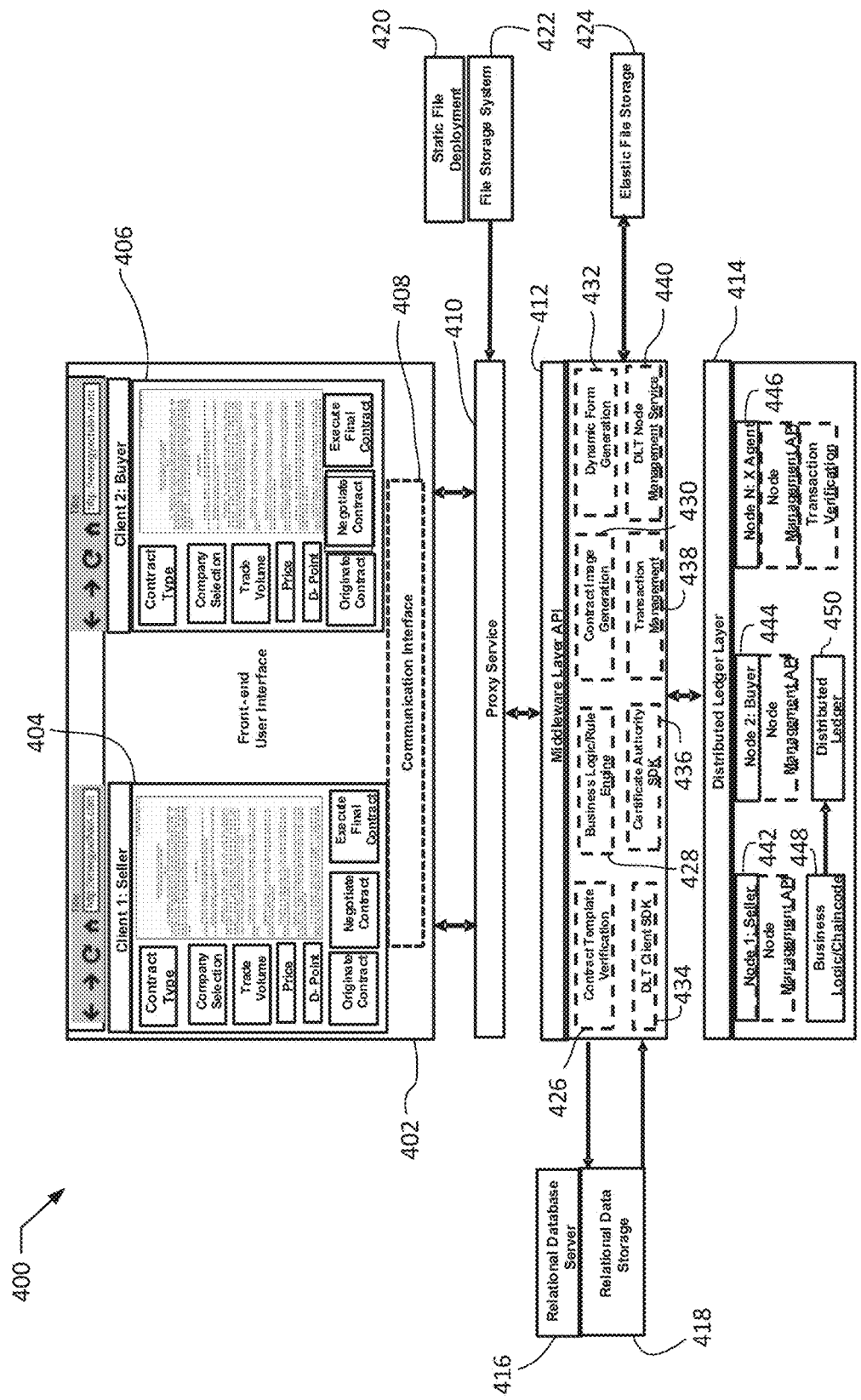
FIG. 4 depicts a system for creating contracts for energy transactions according to exemplary embodiment of the present disclosure.

FIG. 4 depicts a system 400 for creating contracts (e.g., conventional contracts, smart contracts) for energy transactions according to exemplary embodiment of the present disclosure. The system 400 includes a front-end user interface 402, proxy service 410, a middleware layer API 412, and a distributed ledger layer 414. The front-end user interface 402 may be configured to provide one or more interfaces used to negotiate, prepare, and/or execute energy transaction contracts. For example, the front-end interface 402 includes a seller interface 404 and a buyer interface 406. Interfaces 404, 406 provided by the front-end interface 402 may include graphical interfaces (e.g., as depicted) and/or other types of interfaces (e.g., text-based interfaces, command line interfaces). In certain instances, the interfaces 404, 406 may be accessible via a web interface. In additional or alternative instances, the interfaces 404, 406 may be accessible via local software, smartphone applications, command line applications, and the like. The front-end user interface 402 also includes a communication interface 408. The communication interface 408 may be used to provide synchronous or asynchronous communication services between the interfaces 404, 406 provided by the front-end user interface 402. For example, the communication interface 408 may enable the seller interface 404 to communicate with the buyer interface 406 using one or more communication protocols, such as the hypertext transfer protocol (HTTP), the advanced message queueing protocol (AMQP), and the like.

The proxy service 410 may be configured to facilitate communication between the front-end user interface 402 and the middleware layer API 412. For example, the proxy service 410 may provide one or both of load-balancing services and static caching services. For example, the middleware layer API 412 may be implemented by one or more computing devices, and the proxy service 410 may provide load-balancing services by selecting particular computing devices that implement the middleware layer API 412 used to provide services to particular instances of the front-end user interface 402 based on current operating loads (e.g., computing resource usage, processor usage, memory usage). For example, the proxy service 410 may select a particular computing device such that the average operating loads are balanced across the computing devices implementing the middleware layer 412. The proxy service 410 may also provide static caching services that store one or more resources utilized by the front-end interface 402 for quick retrieval by the front-end interface 402. For example, the proxy service 410 may interact with a static file deployment 420. For example, the static file deployment 420 may implement a file storage system 422 (e.g., a local database, a database implemented by one or more servers, a distributed database implemented at least in part by a blockchain). For example, the file storage system 422 may store templates (e.g., contract templates) used by the front-end user interface 402.

The middleware layer API 412 may be configured to provide multiple services used in creating, negotiating, validating, executing, storing, and monitoring compliance of energy transactions and corresponding smart contracts in interactive manner. In particular, the middleware layer API 412 includes a contract template verification service 426, a business logic/rule engine 428, a contract image generation service 430, a dynamic form generation service 432, a DLT client standard development kit (SDK) 434, a certificate authority SDK 436, a transaction management service 438, and a DLT node management service 440. The contract template verification service 426 may be used to verify one or more aspects of negotiated contracts prior to execution of the contract. For example, the contract template verification 426 may be configured to ensure that a proper contract template is used to negotiate an energy transaction. As a specific example, the contract template verification service 426 may be configured to ensure that the proper contract template is used for a particular energy resource or service (e.g., oil, natural gas or buy/sell, transportation) of the energy transaction.

The dynamic form generation service 432 may provide schema specification for the energy transaction and may serve as an endpoint for the seller and buyer interfaces 404, 406. For example, the schema specification may identify types of data that can be added to a contract template for the energy transaction. For example, information (e.g., buyer information, seller information, trade volume information, price information, delivery point information) may be added to the contract template during negotiation and preparation of the contract. The schema may specify which types of data may be added to the contract template and where the information is included within the contract template (e.g., within the text of the contract template) to generate a final contract. Furthermore, by creating an endpoint for the seller and buyer interfaces 404, 406, both the seller and buyer (and any other parties of the transaction) may be able to view data added to the contract as the contract is negotiated.

The contract image generation service 430 may be configured to generate images of finalized contracts. Once a contract is agreed to by the seller and the buyer, the contract may be finalized as an image of the finalized copy of the contract (e.g., the contract template incorporating any data added during negotiation and preparation, buyer and seller information, buyer and seller signature). The contract image generation service 430 may then store the image of the finalized copy of the contract. For example, the contract image generation service 430 and/or the middleware layer API 412 may communicate with an elastic file storage 424. The elastic file storage 424 images of finalized contracts, along with corresponding information (e.g., a transaction identifier, buyer information, seller information). In certain instances, the contract image generation service 430 may include a hash corresponding to a transaction or block on a distributed ledger corresponding to the finalized copy of the contract.

The DLT client SDK 434 may provide communication services with the distributed ledger layer 414. For example, the DLT client SDK 434 may provide communication services to commit, query, and verify data stored on a distributed ledger 450 of the distributed ledger layer 414. As explained further below, one or more transactions may be added to the distributed ledger 450 during the creation, negotiation, and finalization process for a contract of an energy transaction. The DLT client SDK 434 may be used by other services provided by the middleware layer 412 to communicate with the distributed ledger 450 to add the transactions (e.g., after consensus is reached by one or more nodes implementing the distributed ledger). Additionally or alternatively, one or more services of the middleware layer API 412 may retrieve and/or verify data stored on the distributed ledger 450. In such instances, the DLT client SDK 434 may also provide communication services with the distributed ledger 450.

The certificate authority SDK 436 may provision and verify certificates to individual parties to energy transactions (e.g., parties negotiating a contract, third parties of the energy transaction, attorneys or other representatives of parties to the energy transaction) and/or to computing services interacting with the distributed ledger 450. When adding transactions to the distributed ledger 450, the transactions may be required to be signed by a valid certificate. Accordingly, a certificate may be received from one or more parties to energy transaction (e.g., a seller, a buyer) and included within a transaction to be stored on the distributed ledger 450. Prior to providing the transaction to the DLT client SDK 434 for storage on the distributed ledger 450, the certificate authority SDK 436 may be used to verify that the certificate(s) included within the transaction are valid (e.g., were issued to the one or more parties by the certificate authority SDK 436 and/or another certificate issuing authority).

The business logic/rule engine 428 may be configured to automatically apply business logic during fulfillment of the energy transaction. For example, the business logic/rule engine 428 may be used to configure business logic that automatically implements at least a part of the interactive smart contract as the energy transaction is fulfilled. As a specific example, payment under the contract may be staged such that payment automatically issues when particular percentages (e.g., 25%, 50%, 75%, 100%) of an energy resource is delivered by the seller to the buyer. In such instances, as proof is provided that a particular percentage of the energy resource was delivered, the business logic may be executed by the business logic/rule engine 428 to verify the proof and to automatically trigger or complete payment under the contract. In certain instances, the business logic created by the business logic/rule engine 428 may be implemented as an interactive smart contract executing on the distributed ledger 450. For example, the interactive, code-based smart contract may be implemented using a protocol (e.g., the Ethereum protocol and the like) configured to be executed on a blockchain (e.g., the Ethereum blockchain, a private blockchain, and the like).

The transaction management service 438 may be configured to monitor storage of transactions on the distributed ledger 450. For example, the transaction management service 438 may be configured to ensure that a newly-added transaction is properly stored in a new block of the distributed ledger 450, and that the newly-added transaction is reflected on the blocks stored on all nodes implementing the distributed ledger. If one or more nodes of the distributed ledger 450 failed to properly store the newly-added transaction, the transaction management service 438 may invalidate any stored copies of the newly-added transaction. For example, the transaction management service 438 may add an invalidation transaction to the distributed ledger 450, indicating that any previously stored copies of the newly-added transaction are invalid and should not be acted on (e.g., by smart contracts concerning the energy transaction). The transaction management service 438 may additionally or alternatively provide a notification to the seller and/or the buyer (e.g., via the interfaces 404, 406) that indicates the newly-added transaction was not successfully stored on the distributed ledger 450 and needs to be attempted again.

The DLT node management service 440 may be responsible for managing the nodes that implement the distributed ledger 450. For example, the DLT node management service 440 may receive notifications (e.g., from computing devices implementing the nodes) as nodes are added to or removed from implementing the distributed ledger 450 (e.g., removed from or added to a network of computing devices responsible for implementing the distributed ledger 450). In particular, the DLT node management service 440 may communicate with a node management API executing on the nodes to determine when nodes are added to or removed from implementing the distributed ledger 450. In certain instances, the DLT client SDK 434 may communicate with the DLT node management service 440 to identify which nodes can be communicated with to add transactions to the distributed ledger 450.

The middleware layer API 412 may be configured to communicate with one or more servers while implementing the above-described services. For example, the system 400 also includes a database server 416 implementing a data storage 418. One or more of the services discussed above may be configured to store data in the data storage 418 and/or to receive data from the data storage 418.

Additionally or alternatively, further services provided by middleware layer API 412 may be readily apparent to one skilled in the arts in light of the present disclosure. All such additional or alternative services are hereby contemplated within the scope of the present disclosure.

The distributed ledger layer 414 may be configured to implement the distributed ledger 450. In particular, the distributed ledger layer 414 includes nodes 442, 444, 446, may be configured to implement the distributed ledger 450 according to one or more distributed ledger protocols (e.g., a blockchain protocol, the Ethereum protocol, the bitcoin protocol). In certain instances, one or more of the nodes may be implemented by computing devices associated with one or more parties of an energy transaction. For example, the node 442 may be implemented by a seller in an energy transaction, the node 444 may be implemented by a buyer in an energy transaction, and the node 446 may be implemented by a third party agent (e.g., a mediator, a disinterested third party, and the like).

Additionally, the distributed ledger layer 414 includes a business logic/chaincode service 448. The business logic/chaincode service 448 may be configured to monitor for business logic (e.g., interactive smart contracts) executing on the distributed ledger 450. The business logic/chaincode service 448 may then analyze transactions for data indicating compliance with the business logic and may perform additional actions (e.g., processing payments and/or transfers (e.g., electronic funds or cryptocurrency transfers) in accordance with the conditions identified within the business logic (e.g., interactive smart contracts).

All or part of the system 400 may be implemented by a computing device. For example, the front-end user interfaces 402, the proxy service 410, the middleware layer API 412, the distributed ledger layer 414 (e.g., the nodes 442, 444, 446), the static file deployment 420, the file storage system 422, database server 416, the data storage 418, and/or the elastic file storage 424 may be implemented by one or more computing systems. As a specific example, the one or more computing systems may include one or more processors and/or one or more memories. The one or more memories may store instructions which, when executed by the one or more processors, cause the one or processors to implement at least one operational feature of the front-end user interfaces 402, the proxy service 410, the middleware layer API 412, the distributed ledger layer 414 (e.g., the nodes 442, 444, 446), the static file deployment 420, the file storage system 422, database server 416, the data storage 418, and/or the elastic file storage 424.

FIGS. 5A-5D depict stages 500, 520, 530, 540 of a process for originating, negotiating and executing an energy transaction according to an exemplary embodiment of the present disclosure. The stages 500, 520, 530, 540 may be performed by a computing system, such as the system 400. In the stage 500, a first user may select (e.g., at operation 502) a contract type via the seller interface 404 (e.g., using a contract type button of the seller interface 404). For example, the first user may represent a selling party for an energy transaction and may select from a plurality of contract types. In one specific example, an energy transaction includes the sale and/or delivery of natural gas, although other examples may concern different types of energy resources. For natural gas transactions, the contract types may include one or more of buy/sell agreements, firm transportation agreements (FT), interruptible transportation agreements (IT), pooling agreements, park and loan agreements (PAL), storage agreements, and the like.

Each of the contract types may have one or more associated contract templates. Templates may be prepared by attorneys and business experts to incorporate and/or comply with requirements applicable to the different types of requirements applicable to energy transactions (e.g., legislative requirements, regulatory requirements, business requirements). Contract templates may include standardized form wording of the actual business contract, but may exclude transaction specific information for the energy transaction (e.g., information of the transacting parties, transacting energy resource or service, price, quantity information, receipt/delivery point, and the like).

After a contract type is selected, a corresponding template may be received from the file storage 422 of the static file deployment 420 (e.g., at operation 504). For example, each contract type selectable by the first user may have a particular unique identifier and a corresponding template may be stored in the file storage 422 of the static file deployment 420 (e.g., stored in association with the particular unique identifier). After a contract type is selected, a corresponding contract template 510 may be identified within the file storage based on the unique identifier associated with the selected contract type. Additionally or alternatively, contract templates 510 may be stored within a distributed ledger, such as a file storage deployment on the distributed ledger 450. The static file deployment 420 may then transmit the corresponding contract template to the seller interface 404 (e.g., to a computing device implementing the seller interface 404). For example, the seller interface 404 may receive the contract template 510 via the proxy service 410. Once received, the contract template 510 may be updated to include an identifier of the seller (e.g., an email address of the seller, a name of the seller, a unique identifier of the seller and the like). In certain instances, the identifier of the seller may include a unique identifier issued by the certificate authority SDK 436 and/or the horizontal BaaS apps 304.

The first user may then originate the contract (e.g., operation 506) by selecting the originate contract button. Originating the contract may include adding a first transaction to the distributed ledger 450 (e.g., via the distributed ledger layer 414. The first transaction may be added in a first block 508 of the distributed ledger 450. The first transaction may include (i) an identifier of the seller and (ii) an identifier of the selected contract type (e.g., selected contract template 510). For example, identifiers of the seller and/or selected contract type may be stored as metadata of the first transaction.

Figure 5A:
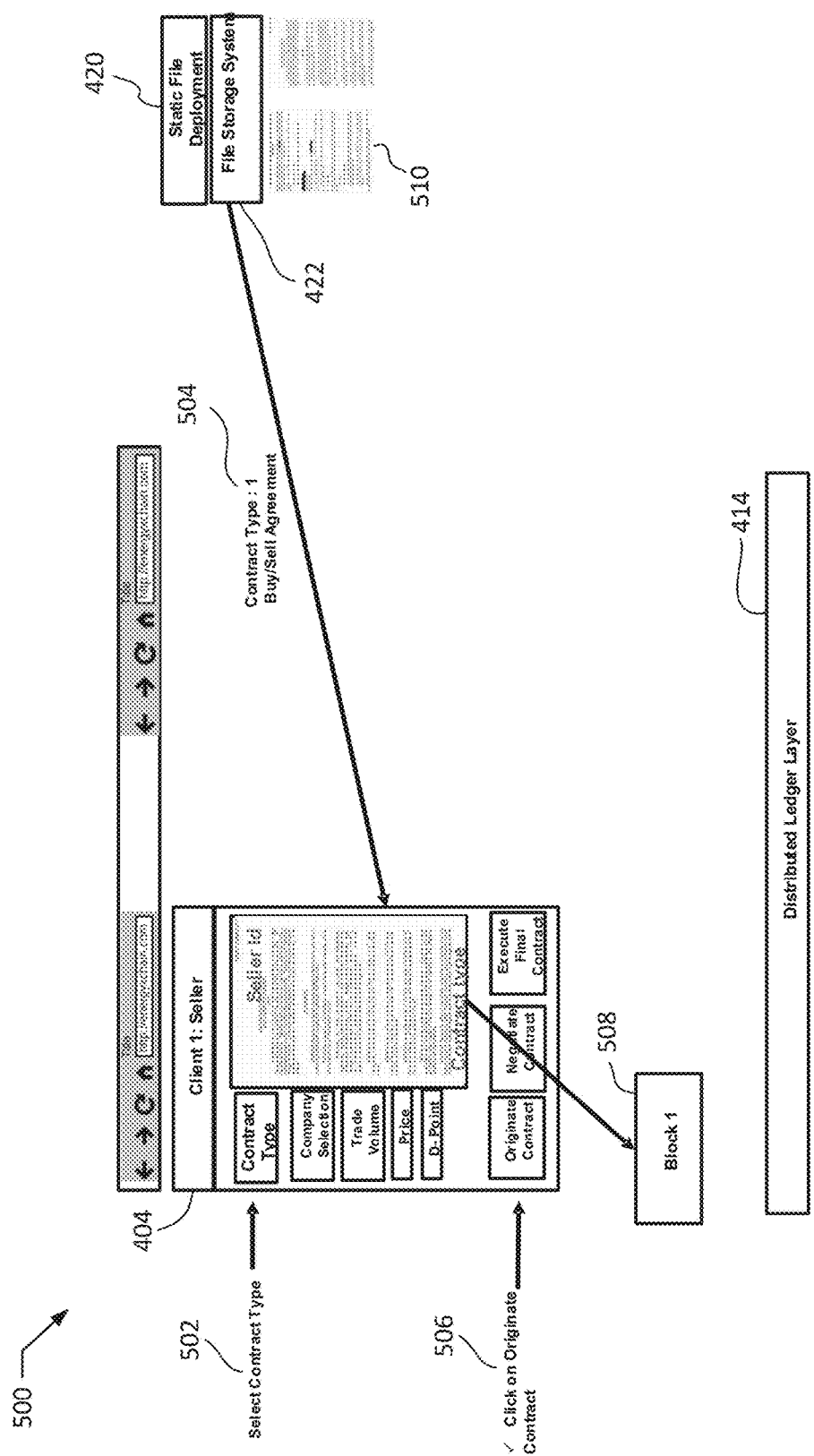
FIGS. 5A-5D depict stages of a process for originating, negotiating and executing an energy transaction according to an exemplary embodiment of the present disclosure.
Figure 5B:
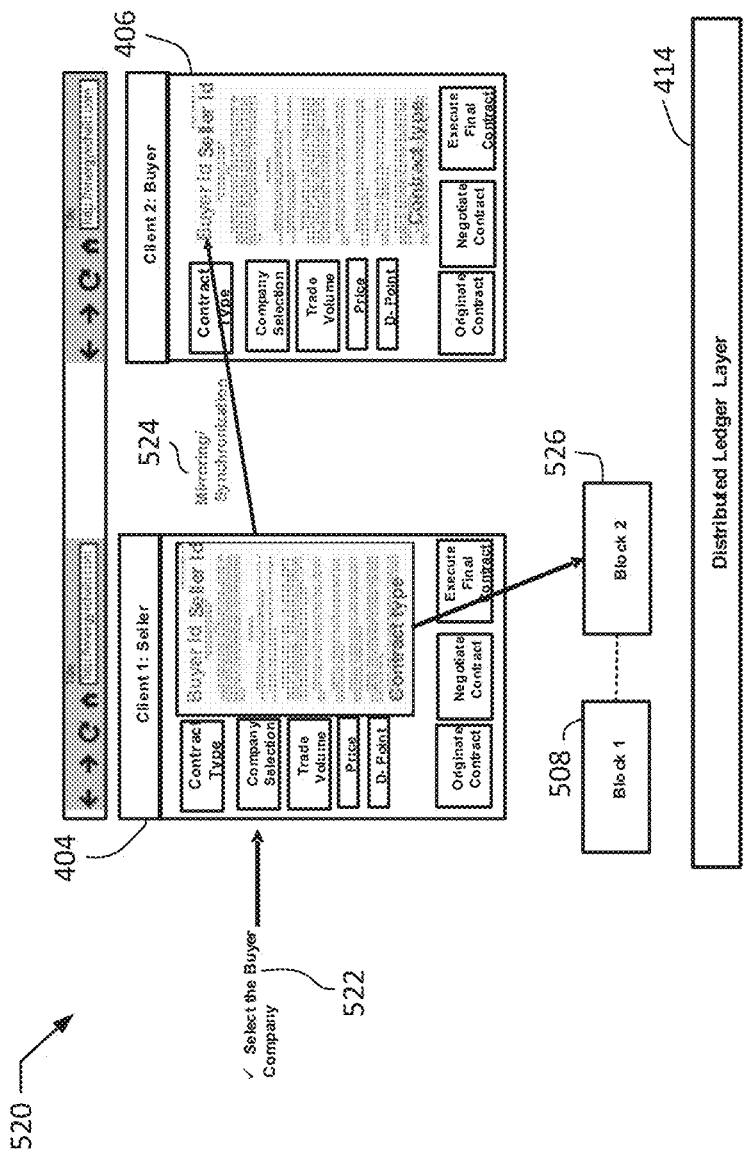

Turning to stage 520 and FIG. 5B, a buyer may be selected (e.g., at operation 522). The buyer company may be selected when the first user selects the company selection button of the seller interface 404. The buyer company may be selected based on one or more unique identifiers of the buyer (e.g., an email address of the buyer, a name of the buyer, a unique identifier of the buyer, and the like). Once the buyer company is selected, an identifier of the buyer may be added to the contract template (e.g., within one or more fields of the contract template). In certain instances, rather than having the first user individually identify the buyer, alternative mechanisms (e.g., auction mechanisms) may be used to identify a buyer willing to pay a specified price for the energy resource and/or energy transaction.

The updated contract may then be transmitted to the buyer (e.g., at operation 524). For example, the seller interface 404 and the buyer interface 406 may communicate via the communication interface 408. The updated contract may include identifiers of the buyer and the seller added to corresponding fields of the contract template received at operation 504.

A second transaction may then be added to the distributed ledger 450. For example, the second transaction may be added to a second block 526 of the distributed ledger 450. The second transaction may include (i) an identifier of the seller, (ii) an identifier of the buyer, and (iii) an identifier of the contract type. In certain implementations, the second transaction may also include a copy of the updated contract and/or a hash of the updated contract. Furthermore, the identifier of the buyer may include a unique identifier issued by the certificate authority SDK 436 and/or the horizontal BaaS apps 304.

Figure 5C:
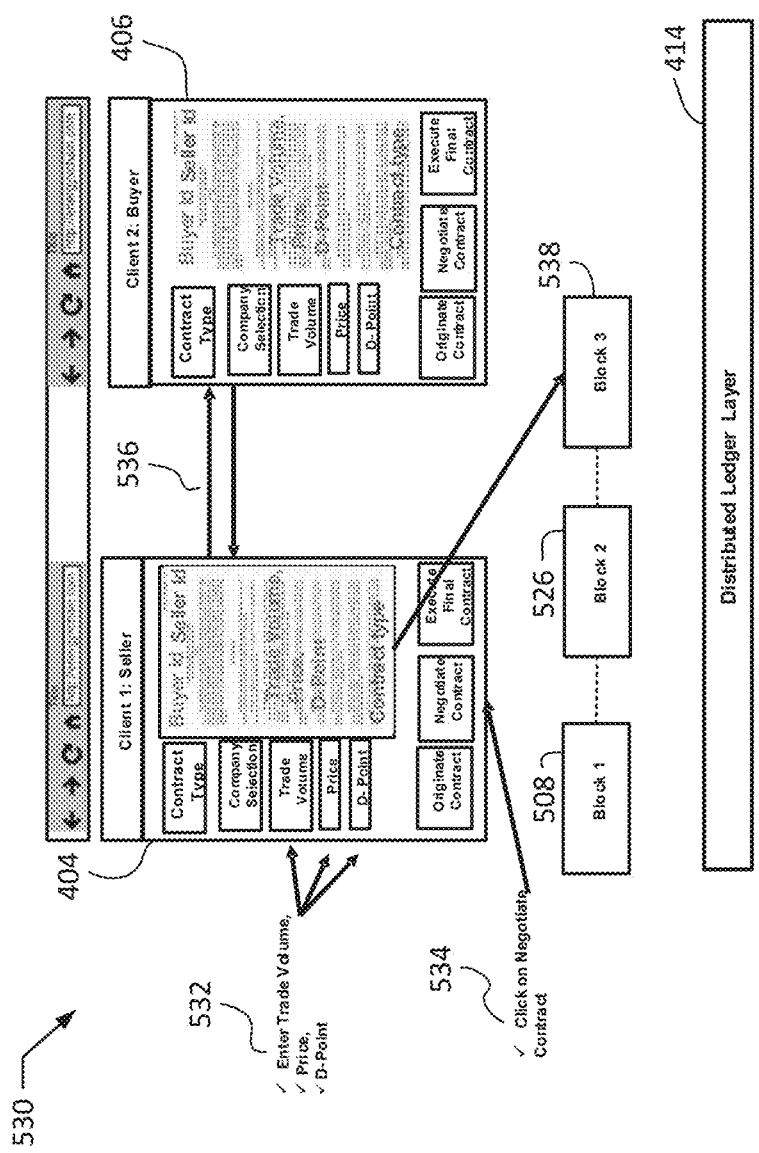

Turning to stage 530 and FIG. 5C, transaction information may be added to the contract (e.g., at operation 532). For example, transaction information may be received via the seller interface 404 and/or the buyer interface 406. In one specific instance, transaction information including trade volume for the energy resource, price information for the energy resource, and delivery-point information for the energy resource. In additional or alternative implementations, all or part of the transaction information may be received via the buyer interface 406. After one party (e.g., the seller) enters all or part of the transaction information, an updated version of the contract may be generated that incorporates the provided transaction information. For example, a trade volume may be received and copies of the trade volume may be added to corresponding fields within the contract template. The party may click the negotiate contract button (e.g., at operation 534) to present an updated copy of the contract to the other party (e.g., via the communication interface). The updated contract may then be transmitted (e.g., at operation 536) to the other party (e.g., the buyer). The updated contract may include one or more smart contract features (e.g., smart contract code representative of proposed contract terms), simplifying the transmittal of review of contracts under negotiation. In certain implementations, a third transaction may be added to the distributed ledger 450. For example, the third transaction may be added to a third block 538 of the distributed ledger 450. The third transaction may include (i) an identifier of the seller, (ii) an identifier of the buyer, (iii) an identifier of the type of contract, (iv) indications of received transaction information, and/or (v) an agreement status (e.g., under negotiation, awaiting buyer action, awaiting seller action).

One or more of the operations 532, 534, 536 may be repeated. For example, all required transaction information may not be received from the seller interface 404. In such instances, further transaction information may be received from the buyer, which may repeat one or more of the operations 532, 534, 536 to generate an updated version of the contract, transmit the updated copy to the seller interface 404, and add a further transaction to the distributed ledger 450.

Figure 5D:
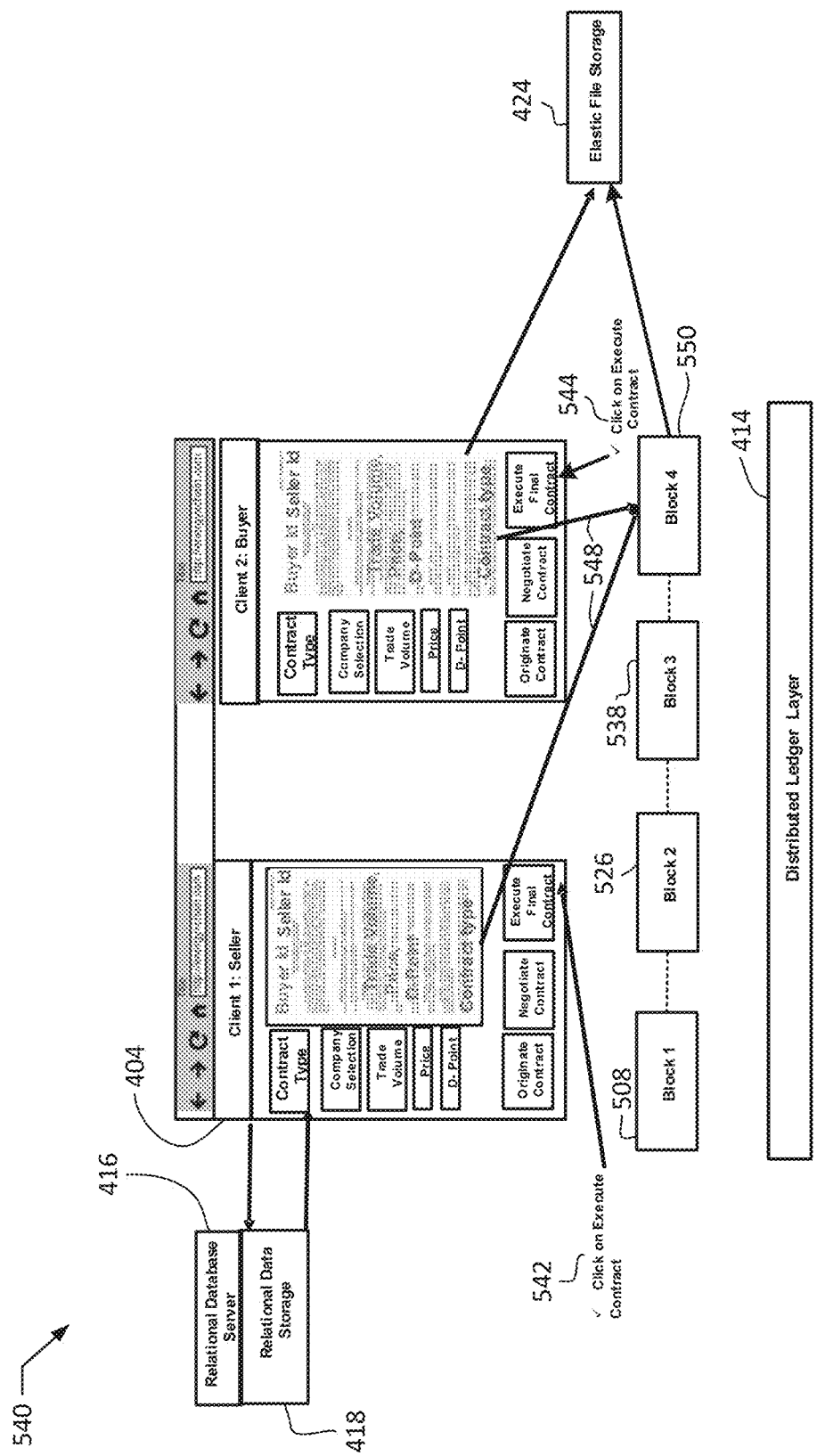

Turning to stage 540 and FIG. 5D, once all transaction information is received, one or both parties to the energy transaction may execute the contract (e.g., at operations 542, 544). For example, the first user associated with the seller and a second user associated with the buyer may both be required to click an execute final contract button in the seller interface 404 and the buyer interface 406. In a further example, the seller and buyer interfaces 404, 406 may not make the execute final contract button available until after all required transaction information is provided by one or both of the seller and the buyer (e.g., or associated users). For example, the contract template received may specify particular types of transaction information (e.g., trade volume, price, delivery point) that are required for a contract regarding the specified type of energy transaction. The interfaces 404, 406 may compare received transaction information to the required transaction information and may make the execute final contract button available when all required transaction information is received.

Once the contract is executed, a finalized copy of the contract may be stored. For example, an image of the finalized copy of the contract may be generated (e.g., by a contract image generation service 430 and may be stored in the elastic file storage 424 or another storage system), as explained above. Additionally or alternatively, a fourth transaction may be stored in the distributed ledger 450. For example, the fourth transaction may be stored in a fourth block 550 of the distributed ledger 450. The fourth transaction may include (i) an identifier of the seller, (ii) an identifier of the buyer, (iii) an identifier of the contract type, (iv) indications of the received transaction information, and/or (v) an agreement status (e.g., finalized). Additionally or alternatively, the fourth transaction may include a unique identifier of the finalized contract (e.g., a hash of an image of the finalized contract). Once the fourth transaction is added to the distributed ledger 450 and/or a copy of the finalized contract is stored in the elastic file storage 424, the process for negotiating the energy transaction may be complete.

In the above-described examples, the contract negotiation procedures were initiated by the seller. In additional or alternative instances, contract negotiation procedures may be implemented by another party, such as the buyer, transporter or transaction manager. Furthermore, in certain implementations, one or more of the transactions added to the blockchain may be omitted. As a specific example, certain implementations may omit the first transaction added to the first block 508. Additionally, as depicted, the blocks 508, 526, 538, 550 are sequential. It should be understood that, in practice, these blocks may not be added sequentially to the distributed ledger and that additional, intervening blocks may also be added to the distributed ledger between one or more of the blocks 508, 526, 538, 550.

The process described above in the stages 500, 520, 530, 540 may enable details regarding energy transactions and corresponding contracts to be stored in a distributed ledger 450. In particular, the transactions added to the distributed ledger in response to the negotiation and execution of contracts corresponding to energy transactions may reduce the overall amount of data that is required to be stored in the disputed ledger 450. For example, rather than storing complete copies of particular contracts, the transactions as described above may store information included within one or more template fields of a contract template corresponding to the identified type of energy transaction and corresponding contract template. Based on this information, and using the corresponding contract templates, a complete copy of the executed contract may be reconstructed from data stored in the distributed ledger even if a contract template may be retrieved from the static file deployment 422 and/or the file storage system 422 and may be combined with the information stored within transactions of the distributed ledger to generate a new, complete copy of the contract for the energy transaction. Such implementations can improve scalability for certain implementations of the system 400, for example implementations relying on privately-hosted blockchains or blockchains with high data storage costs. As a further example, by reducing the overall storage required on the distributed ledger, the above-discussed techniques may improve scalability for transaction negotiation systems.

Additionally, these techniques may not depend on implementation details for particular types of distributed ledgers and may accordingly be used to combine one or more different types of distributed ledgers, providing cross compatibility for energy transaction and related contract storage. The proposed approach may function in any DLT or similar technology which may or may not have an interactive smart contract feature. If the above techniques are implemented using a distributed ledger that supports smart contracts, the contract may execute in a hybrid (e.g., code-based and text-based) interactive smart contract mode in on and off-chain domains. If the above techniques are implemented using a distributed ledger that does not support smart contracts, the contract may function as off-chain and text based smart contract where the core data is kept as metadata in a distributed ledger as an immutable record of the finalized contract. Furthermore, as explained above, stored contracts may be combined with interactive smart contracts executing automatically within the distributed ledger to ensure compliance with conditions specified within the contract.

Furthermore, transactions relating to the same agreement may be linked. As a specific example, subsequent transactions stored on the distributed ledger by the system 400 may include identifiers of previously-stored transactions relating to the same agreement. Furthermore, where additional security is required, all or part of the contents of the transactions may be encrypted prior to storage on the distributed ledger 450.

In addition, because new transactions may be added to the blockchain as the parties exchange updated drafts of a contract (e.g., based on differing transaction information inputs), the above-described process may enable interactivity via the distributed ledger. This may preserve a copy of negotiations, which may be accessible to parties seeking to confirm previous negotiation offers and/or agreed-upon terms. Furthermore, this interactivity may combine agreement storage with smart contract logic, allowing agreements to be automatically implemented at least in part.

Furthermore, the above-described process may be combined with one or more additional features. As one specific example, credit information for one or more parties of the energy transaction may be monitored. For example, credit information may be used by a selling party to establish a credit limit for a buying party, which may be included within a finalized copy of a contract between the selling party and the buying party.

As another example, predictive contracting services may be used to facilitate negotiation of the contract. For example, one or more machine learning models may be used to predict the transaction information included within the contract (e.g., subject to review and approval by one or more parties to the energy transaction). As a specific example, the machine learning model may analyze one or more of the following parameters: meteorological parameters (e.g., temperature, wind speed, precipitation, and humidity), measurement parameters from an energy installation (e.g., metering and other production data from SCADA and DCS systems at the energy installation), financial parameters (e.g., credit information for one or more parties of the energy transaction), and other operational parameters concerning an energy resource of the energy transaction. The machine learning model may include one or more machine learning models, such as one or more artificial neural networks (ANN), support vector machines (SVM), Gradient Boosting Trees, and the like. The machine learning model may be trained to predict transaction information, such as trade volume, price, transportation capacity, price volatility, anticipated future demand, anticipated future production, and the like. Final predicted quantities for the transaction information may be added to a draft of the contract and provided to one or more parties of the transaction or may be added to a corresponding user interface for review by one or more parties. Additionally or alternatively, one or more machine learning models may be configured to monitor and/or correct smart contracts executing on the distributed ledger to implement the energy transaction. For example, machine learning models may analyze information provided to prove compliance with the energy transaction to detect when fraudulent information is submitted (e.g., fraudulent payment information, fraudulent energy resource delivery information, and the like). In still further implementations, one or more machine learning models may be trained to update all or part of the transaction information within a contract concerning an energy transaction (e.g., with approval from one or more parties of the energy transaction). For example, the machine learning model may be configured to update volume information, price information, and the like based on real-world operating conditions (e.g., production conditions, market conditions, financial conditions for one or more parties, energy resource usage conditions, and the like).

Furthermore, the system 400 and related DLT may be used to continue monitoring other aspects of the energy transaction after a transaction has been negotiating. For example, the system 400 may be further configured to monitor or execute one or more of a nomination process; a confirmation process; a scheduling process; a reconciliation process; billing and payment processes; and imbalance resolution processes.

For example, a request for transportation (e.g., of an energy resource) may be submitted electronically by node 1 (e.g., a seller or shipper). This request may serve as a nomination, which can be effective for various time periods such as a current day, a future day, a day in the past, and the like depending on one or more regulatory requirements (e.g., the North American Energy Standards Board (NAESB) determined cycles). Certain standards (e.g., Federal Energy Regulatory Commission (FERC) standards) may regulate the nomination deadlines for energy transactions, relevant information to be included within nominations, and/or communication methods to be used in transmitting or receiving nominations. For example, the request for transportation may include contract volume, receipt and delivery locations, intraday, future, and past day periods and the like.

A distributed ledger may receive information from multiple parties (e.g., as transactions received via interfaces 402, from internal or external storage systems). Optimization systems may analyze the received information to optimize the receipts of all parties, recognizing receipt and delivery priorities, commodity costs, shipping costs, fuel, other costs, and the like. The optimization systems may then determine an appropriate period for the nomination and the cycle during which the nomination should be submitted and submits the nomination at the appropriate time. Any transaction party may observe the status of the energy transaction at any time by analyzing transaction and associated metadata added to the distributed ledger.

In the confirmation process the transacting agents' submitted nominations are approved with regard to parties, contracts, locations and volumes while considering the regulatory (e.g., NAESB) cycles. For example, the system 400 may receive the parameters confirmed by the producer, pipeline and/or distributor and may compare the received parameters to the nomination submitted to ensure the parameters accurately reflect the nomination (and/or vice-versa).

Official communications from the system 400 may be transmitted via email and a simultaneous indicator may be depicted in a user interface 402 to indicate that the confirmation process is completed. Related records may be stored on the distributed ledger to finalize the confirmation process.

Scheduling may occur when a scheduling process (e.g., a scheduling process executing on a computing device associated with a transporter of the energy resource) schedules one or more nominations after an evaluation process. Priority of service (PoS) for the scheduling process may be sorted based on one or more of firm, non-secondary reverse path (NSRP), secondary firm and interruptible. Evaluations by the scheduling process may be made based on one or more of shipper's contract rights, contract capacity, constraints, confirmations, elapsed pro rata scheduled quantity (EPSQ), storage rights and pool balancing specified in the shipper's contract and the pipeline or distributor's tariffs. The scheduling process may then provide the system (e.g., via the distributed ledger 450) the volumes scheduled. If the scheduled and nominated volumes do not balance, the system 400 may execute an optimization algorithm to produce an additional nomination. If a solution is not produced, the transporter may be notified.

When energy resources are delivered, one or more meter devices may record the amount of energy resource (e.g., natural gas) delivered and received among all parties. If a received amount of an energy resource does not equal the nominated shipping volumes and actual consumption, an "imbalance" is recorded, which may require additional reconciliation. Reconciliation options may be governed by an operational balancing agreement (OBA), which may contain an imbalance section describing how imbalances may be reconciled. The transporter may also provide the system with one or more of platform receipt, delivery, storage, fuel, park/loan, and imbalance measurements as they become available for particular time periods (e.g., one day, one week, one month, etc.). Records of received information may be stored both on the distributed ledger and on one or more databases. Delivery reports and the like may also be generated at this stage.

The OBA may give authorization for automated, final resolution of any discrepancy between measured and scheduled quantities at a node to the shipper's OBA Agent. Reconciliation options may include one or more of 100% in kind repayment, 100% cash payment, and a hybrid of the two. If an imbalance exists, the system 400 may run an optimization algorithm for a time period (e.g., one day, one week, one month) to assess whether cash-out, in kind, trading, or a hybrid approach is preferable. If cash-out is selected, the system 400 may automatically initiate an electronic funds transfer to the billing party's financial institution. If in kind and/or trading is selected, the system 400 may run an optimization algorithm to create and submit a nomination for the discrepancy. The UI may display a status and condition of the reconciliation process.

Transporters may receive invoices for their cash-out, commodity and demand charges at the end of the month and may initiate payment. For example, a supplier, pipeline or distributor may provide the system 400 with amounts due for a preceding time period (e.g., a day, a week, a month, etc.). The system 400 may verify these amounts (e.g., based on information stored on the distributed ledger 450. The system 400 may also initiate an electronic funds transfer to the billing party's financial institution for the indicated amount.

The system 400 may also generate invoices and an indication of a responsible agent for issued payments. Such records may be stored (e.g., on the distributed ledger, within a database or other storage system). In certain instances, the system 400 may also perform taxation and audit processes (e.g., when requested by a user).

Technical data and/or financial data may also be received and stored for future use. For example, data regarding nominations, fulfillment, discrepancies, and the like may be used to train one or more of the machine learning models discussed herein.

Figure 6:
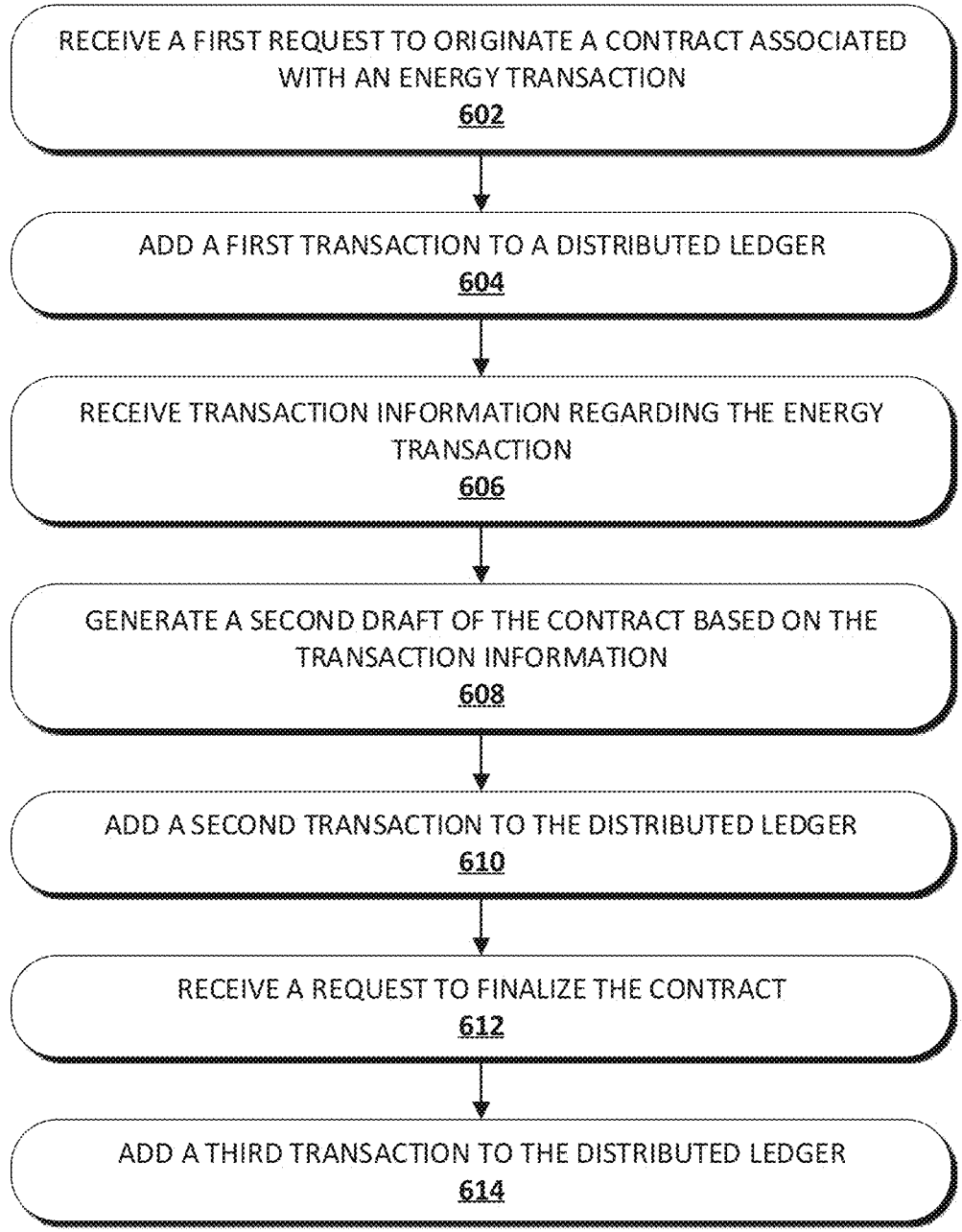
FIG. 6 depicts a method for originating, negotiating and executing a contract for an energy transaction according to an exemplary embodiment of the present disclosure.

FIG. 6 depicts a method 600 for originating, negotiating and executing a contract for an energy transaction according to an exemplary embodiment of the present disclosure. The method 600 may be implemented on a computer system, such as the system 400. The method 600 may also be implemented by a set of instructions stored on a computer readable medium that, when executed by a processor, cause the computer system to perform the method 600. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving a first request to originate a contract associated with energy transaction (block 602). For example, the first request may be received from a first computing device associated with a first party of the energy transaction. The first request may include a first draft of the contract. For example, the first draft may be prepared based on a contract template associated with a contract type for the energy transaction.

A first transaction may be added to a distributed ledger (block 604). The first transaction may be generated at least in part based on contents of the first draft of the contract. For example, the first transaction may include an identifier of the first party and an identifier of a second party associated with the energy transaction.

Transaction information regarding the energy transaction may be received (block 606). For example, the transaction information may be received from the first computing device and/or a second computing device associated with the second party of the transaction. The transaction information may include one or more of volume information, price information, and/or delivery point information.

A second draft of the contract may be generated based on the transaction information (block 608). For example, one or both of the first computing device and the second computing device (or another computing device associated with the system 400) may generate the second draft of the contract by adding the transaction information to corresponding fields within the contract template.

A second transaction may be added to the distributed ledger (block 610). For example, the second transaction may be generated at least in part based on contents of the second draft of the contract. As a specific example, the second transaction may include a copy of one or more items of the transaction information (e.g., items added to the second draft of the contract). In certain instances, additional transaction information may be received regarding the energy transaction. In such instances, blocks 606, 608, 610 may be repeated.

A request may be received to finalize the contract (block 612). For example, the request to finalize the contract may be received from the first computing device and/or the second computing device. In certain instances, the first computing device may submit the request to finalize the contract and the second computing device may subsequently submit a request to finalize the contract (or vice versa).

A third transaction may be added to the distributed ledger (block 614). For example, the third transaction may be generated at least in part based on the contents of the finalized contract. As a specific example, the third transaction may include a copy of all or part of the transaction information included within the finalized contract. Additionally or alternatively, the third transaction may include a hash of an image of the finalized contract, which may be used to authenticate the finalized contract (e.g., after retrieving a copy of the finalized contract from another storage device).

In this way, the method 600 may enable negotiation of and storage of contracts relating to energy transactions (or other types of transactions) using a distributed ledger. As explained further above, the techniques used to generate the transactions added to the distributed ledger may reduce the overall information required to be stored on the distributed ledger, improving scalability and interoperability of these techniques. Furthermore, the method 600 may enable storage of an immutable copy of relevant information regarding the contracts, including information that may be used to validate other copies of the finalized contract.

Figure 7:
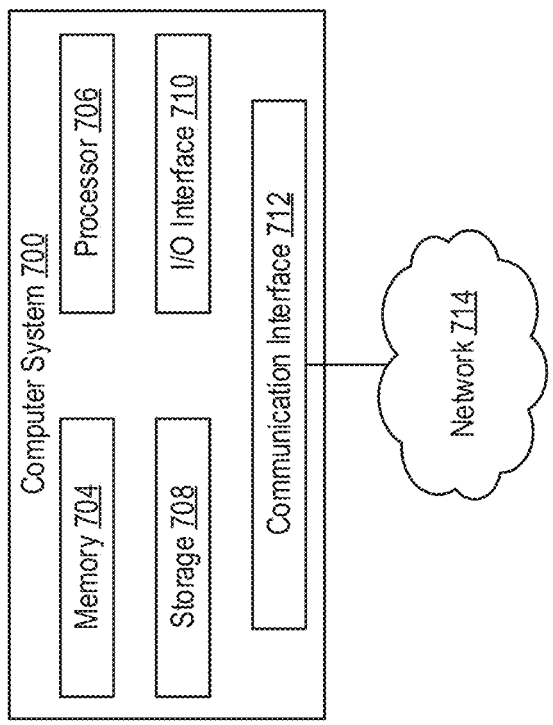
FIG. 7 illustrates a computing system, according to an exemplary embodiment of the present disclosure.

FIG. 7 illustrates an example computer system 700 that may be utilized to implement one or more of the devices and/or components discussed above, such as the business application layer 302 and components thereof, the middleware layer 308 and components thereof, the distributed ledger and machine learning layer 314 and components thereof, the front-end user interface 402, and components thereof, the proxy service 410, the middleware layer API 412 and components thereof, the distributed ledger layer 414 and components thereof, the relational database server 416, the relational data storage 418, the static file deployment, the file storage system 422, and/or the elastic file storage 424. In particular embodiments, one or more computer systems 700 perform one or more operations of one or more methods described or illustrated herein. In particular embodiments, one or more computer systems 700 provide the functionalities described or illustrated herein. In particular embodiments, software running on one or more computer systems 700 performs one or more operations of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or nodebook computer system, an interactive kiosk, a mainframe, a mesh of computer systems, a mobile telephone, a personal digital assistant (PDA), a server, a tablet computer system, an augmented/virtual reality device, a quantum computing device, an internet of things (TOT) computing device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 702. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 804, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for it. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 712 for any of these networks, where appropriate. Communication interface 712 may include one or more communication interfaces 712, where appropriate. Although this disclosure describes and illustrates a particular communication interface implementations, this disclosure contemplates any suitable communication interface implementation.

The computer system 700 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   receiving, from a first computing device associated with a first party of an energy transaction, a first request to originate a contract associated with the energy transaction, wherein the first request includes a first draft of the contract;
   adding a first transaction to a distributed ledger, the first transaction generated at least in part based on contents of the first draft of the contract;
   receiving, from at least one of the first computing device and a second computing device associated with a second party of the energy transaction, transaction information regarding the energy transaction;
   generating a second draft of the contract based on the transaction information;
   adding a second transaction to the distributed ledger, the second transaction generated at least in part based on contents of the second draft of the contract;
   receiving, from at least one of the first computing device and the second computing device, a request to finalize the contract; and
   adding a third transaction to the distributed ledger, the third transaction generated at least in part based on a finalized version of the contract, wherein the third transaction includes (i) a hash generated at least in part based on an image of the finalized version of the contract and (ii) a smart contract executable to ensure compliance with one or more conditions specified within the contract.

2. The method of claim 1, wherein the third transaction further includes an identifier of the first party and an identifier of the second party.

3. The method of claim 1, further comprising:
   receiving, prior to receiving the first request, a second request to create the contract, wherein the second request specifies a contract type; and
   transmitting, to the first computing device, a contract template associated with the contract type.

4. The method of claim 3, further comprising: adding a fourth transaction to the distributed ledger, the fourth transaction generated at least in part based on the contract template.

5. The method of claim 4, wherein the fourth transaction includes (i) an identifier of the first party and (ii) an identifier of the contract type.

6. The method of claim 3, wherein the smart contract is generated at least in part based on information entered into one or more fields of the contract template.

7. The method of claim 3, wherein generating the second draft of the contract includes adding the transaction information to one or more corresponding fields within the contract template.

8. The method of claim 1, wherein the first transaction includes (i) an identifier of the first and (ii) an identifier of the second party.

9. The method of claim 1, wherein the transaction information includes trade volume information and/or price information.

10. The method of claim 1, wherein the first party and the second party are selected from the group consisting of a seller of the energy transaction and a buyer of the energy transaction.

11. The method of claim 10, wherein at least one of the buyer and the seller are identified using an auction system.

12. The method of claim 1, wherein the second transaction includes (i) an identifier of the of the first party, (ii) an identifier of the second party, and (iii) a copy of at least a subset of the transaction information.

13. The method of claim 1, further comprising executing, via the smart contract, one or more of a nomination process, a confirmation process, a scheduling process, a reconciliation process, billing and payment processes, and imbalance resolution processes.

14. The method of claim 1, further comprising storing, in a database, a copy of at least one of the first draft of the contract, the second draft of the contract, the first transaction and the second transaction.

15. A system comprising:
   a processor; and
   a memory storing instructions which, when executed by the processor, cause the processor to:
      receive, from a first computing device associated with a first party of an energy transaction, a first request to originate a contract associated with the energy transaction, wherein the first request includes a first draft of the contract;
      add a first transaction to a distributed ledger, the first transaction generated at least in part based on contents of the first draft of the contract;
      receive, from at least one of the first computing device and a second computing device associated with a second party of the energy transaction, transaction information regarding the energy transaction;
      generate a second draft of the contract based on the transaction information;

add a second transaction to the distributed ledger, the second transaction generated at least in part based on contents of the second draft of the contract; and receive, from at least one of the first computing device and the second computing device, a request to finalize the contract; and add a third transaction to the distributed ledger, the third transaction generated at least in part based on a finalized version of the contract, wherein the third transaction includes (i) a hash generated at least in part based on an image of the finalized version of the contract and (ii) a smart contract executable to ensure compliance with one or more conditions specified within the contract.

16. The system of claim 15, wherein the third transaction includes an identifier of the first party and an identifier of the second party.

17. The system of claim 15, wherein the instructions further cause the processor to:

receive, prior to receiving the first request, a second request to create the contract, wherein the second request specifies a contract type; and transmit, to the first computing device, a contract template associated with the contract type.

18. The system of claim 17, wherein the instructions further cause the processor to: add a fourth transaction to the distributed ledger, the fourth transaction generated at least in part based on the contract template.

19. The system of claim 18, wherein the fourth transaction includes (i) an identifier of the first party and (ii) an identifier of the contract type.

20. The system of claim 17, wherein the smart contract is generated at least in part based on information entered into one or more fields of the contract template.

* * * * *

UNITED STATES PATENT AND TRADEMARK OFFICE
CERTIFICATE OF CORRECTION

| | |
|---|---|
| PATENT NO. | : 11,501,392 B2 |
| APPLICATION NO. | : 17/565998 |
| DATED | : November 15, 2022 |
| INVENTOR(S) | : Umit Cali, David A. Doctor and Robert W. Norris |

It is certified that error appears in the above-identified patent and that said Letters Patent is hereby corrected as shown below:

In the Claims

In Claim 8, Column 24, Line 26, please replace "the first and" with --the first party and-- therefore.

Signed and Sealed this
Nineteenth Day of March, 2024

Katherine Kelly Vidal
*Director of the United States Patent and Trademark Office*